Sept. 23, 1952      E. V. SANDERS      2,611,554
AIRCRAFT ADJUSTABLE LIFT-PROPELLER CRADLE Filed May 16, 1950      2 SHEETS—SHEET 1

INVENTOR.
Earl V. Sanders
BY Victor J. Evans & Co.
ATTORNEYS

Sept. 23, 1952 — E. V. SANDERS — 2,611,554
AIRCRAFT ADJUSTABLE LIFT-PROPELLER CRADLE
Filed May 16, 1950 — 2 SHEETS—SHEET 2
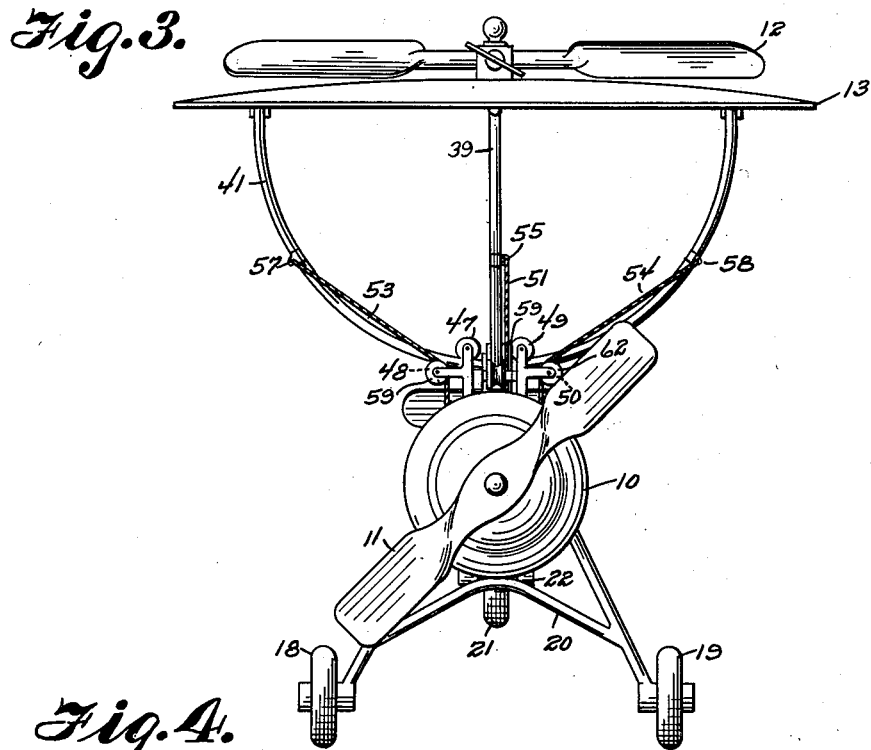
Fig.3.
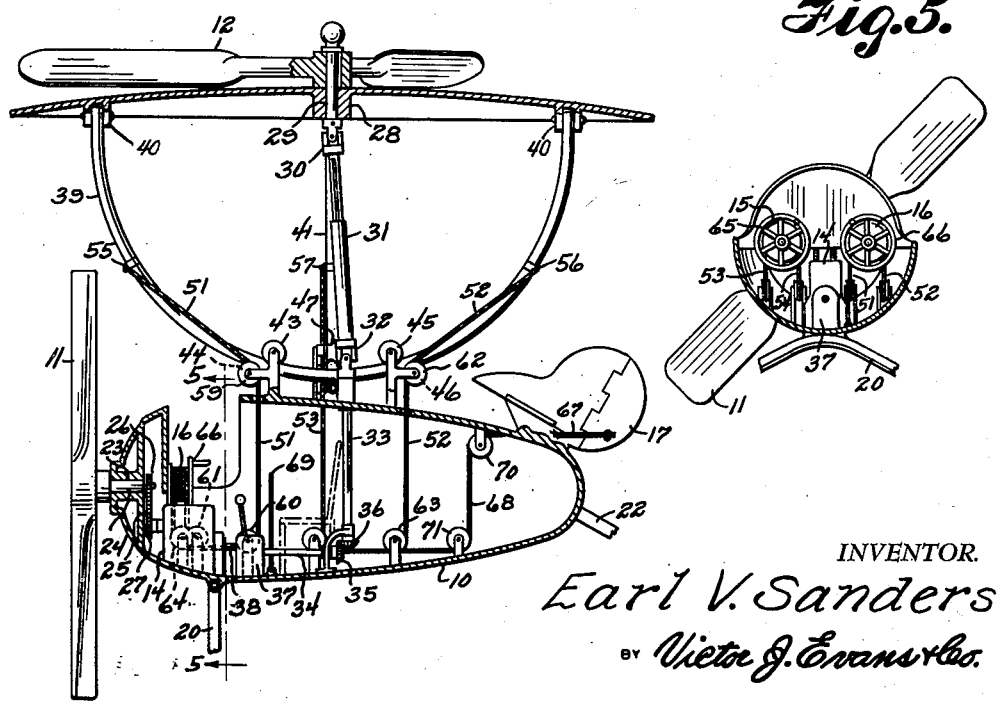
Fig.4.
Fig.5.
INVENTOR.
Earl V. Sanders
BY Victor J. Evans & Co.
ATTORNEYS Patented Sept. 23, 1952

2,611,554

UNITED STATES PATENT OFFICE 2,611,554

AIRCRAFT ADJUSTABLE LIFT-PROPELLER CRADLE

Earl V. Sanders, Pawnee, Ill.

Application May 16, 1950, Serial No. 162,291

3 Claims. (Cl. 244—6)

This invention relates to aircraft of the type having both horizontally and vertically disposed propellers, and in particular this invention relates to control means for adjusting the position of a cradle on which a horizontal propeller is mounted and also means for adjusting the position of a rudder at the end of the fuselage.

The purpose of this invention is to provide means whereby a pilot may readily adjust the position of a horizontally disposed propeller extended upwardly above the fuselage of an air ship.

In the usual type of aircraft of the helicopter type it is customary to adjust the position of the propeller or blade thereof but the mounting means of a propeller on aircraft is critical because the propeller is subjected to enormous strains and stresses and where it is desirable to maintain comparatively light weight structure it is difficult to readily adjust the position of a horizontally disposed propeller. With this thought in mind this invention contemplates providing a substantially semi-spherical cradle carried by and extended upwardly from the fuselage of an air ship whereby a propeller journaled on the cradle is readily adjustable.

The object of this invention is, therefore, to provide means for mounting the horizontally disposed propeller on an air ship whereby the position of the propeller may readily be adjusted from the cockpit of the air ship without danger of the mounting elements permitting the propeller to separate from the air ship.

Another object of the invention is to provide an adjustable mounting for a horizontally disposed propeller on an air plane that may be incorporated in toy air planes and also in air planes for carrying a pilot.

A further object of the invention is to provide mounting means for a horizontally disposed propeller on aircraft whereby the position of the propeller is readily adjustable, which is of a simple and economical construction.

With these and other objects and advantages in view the invention embodies an air ship having a propeller positioned in a vertical plane at the forward end thereof and another propeller positioned in a horizontal plane on the upper side of a disc carried by right angularly positioned semi-circular arms with the horizontally positioned propeller driven by a telescoping shaft with universal joints therein from a motor in the air ship and with the position of the propeller readily adjusted by cables extended to a drum in the air ship.

Other features and advantages of the invention will appear from the following description taken in connection with the drawings wherein:

Figure 3 is a similar view looking toward the forward end of the air ship and showing a front elevation thereof.

Figure 4 is a vertical longitudinal section through the air ship.

Figure 5 is a cross section through the cockpit of the air ship taken on line 5—5 of Figure 4.

Figure 1:
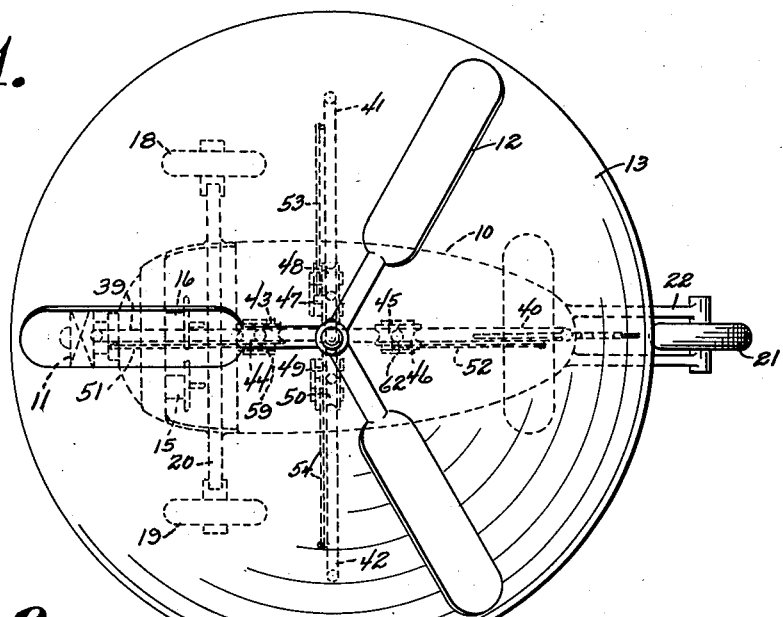
Figure 1 is a plan view of the air ship.
Figure 2:
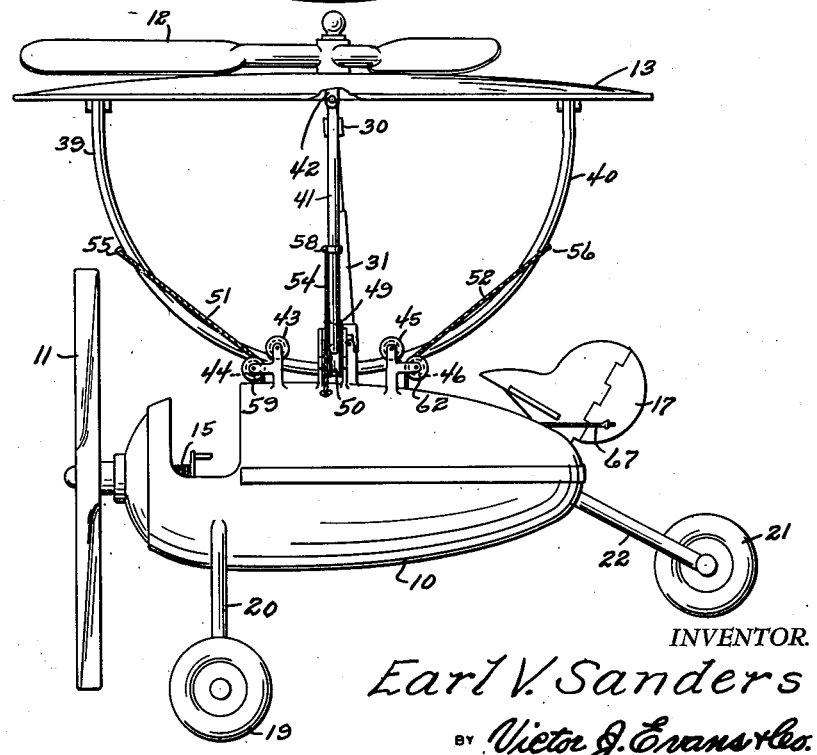
Figure 2 is a side elevational view of the air ship showing the upper horizontally disposed propeller and mounting disc thereof in a horizontal position.

Referring now to the drawings wherein like reference characters denote corresponding parts the improved air ship of this invention includes a fuselage or body 10, a vertically disposed propeller 11 journaled on the forward end of the fuselage, a horizontally disposed propeller 12 journaled on a disc 13, a motor 14, drums 15 and 16 by which the position of the propeller 12 is adjusted, and a rudder 17.

The fuselage 10 is mounted on wheels 18 and 19 at the forward end by a carriage 20 and a rear wheel 21 is journaled in the outer end of a strut 22.

The propeller 11 is journaled in a bearing 23 in the forward end of the fuselage by a shaft 24 and the propeller is rotated by a chain or belt 25 that is positioned on a sprocket 26 on the shaft 24 and also on a sprocket 27 on the shaft of the motor 14.

The propeller 12 is journaled in a bearing 28 in the disc 13 by a shaft 29 and the shaft is connected through a universal joint 30 to a telescoping shaft 31, the lower end of which is connected by a universal joint 32 to a shaft 33 that is driven by a shaft 34 through beveled gears 35 and 36 from a differential housing 37 which is connected to the motor 14 through a shaft 38.

The disc 13 is carried by longitudinally positioned semi-circular arms 39 the ends of which are attached to the disc by hinges 40 and transversely positioned semi-circular arms 41 the ends of which are attached to the disc by hinges 42. The section of the arm 39 at one side is mounted between rollers 43 and 44, the section of the arm 39 on the opposite side between rollers 45 and 46, the section of the arm 41 on one side between rollers 47 and 48 and the section of the arm 41 on the opposite side between rollers 49 and 50.

The position of the horizontally disposed propeller 12 is controlled by cables with cables 51 and 52 extended to opposite ends of the drum 16 and the cables 53 and 54 extended to the opposite ends of the drum 15. With the cables mounted in this manner one cable is paying out as the other is being wound on the drum.

The cable 51 is attached to the section of the arm 39 at one side by a clamp 55, the cable 52 to the section of the arm 39 at the opposite side by a clamp 56, the cable 53 to the section of the arm 41 at one side by a clamp 57 and the cable 54 to the section of the arm 41 at the opposite side by a clamp 58. The cable 51 extends over pulleys 59, 60 and 61 to the drum 16 and the cable 52, over pulleys 62, 63 and 64 to the opposite end of the drum 16. The cables 53 and 54 are trained over similar pulleys to the opposite ends of the drum 15.

The drums 15 and 16 are provided with hand wheels 65 and 66 whereby the position of the horizontally disposed propeller may readily be controlled from the cockpit of the air ship.

The position of the rudder 17 is controlled by cables 67 and 68 from a stick 69 with the cables extending over pairs of pulleys 70 and 71.

By this means an aviator has absolute control over the position of a horizontally disposed propeller carried above the aircraft and the propeller may or may not be used as may be desired.

It will be understood that modifications may be made in the design and arrangement of the parts without departng from the spirit of the invention.

What is claimed is:

1. In an airplane, the combination which comprises a fuselage mounted on wheels, a propeller positioned in a vertical plane at the forward end of the fuselage and mounted to rotate on a horizontal axis, a disc positioned above the fuselage, longitudinally and transversely disposed semi-circular arms extended downwardly from the disc, said arms being crossed at a point spaced from the disc and positioned above the fuselage, rollers journaled on the fuselage and positioned to engage opposite surfaces of the arms to permit swinging of the disc from a point adjacent to the fuselage, means extended from the arms through the upper surface of the fuselage for adjusting the position of the disc, a propeller positioned in a horizontal plane and mounted to rotate on a vertical axis positioned above and journaled in said disc, and means rotating the propeller positioned above the disc from the interior of the fuselage.

2. In a toy airplane, the combination of which comprises a fuselage mounted on wheels, a propeller positioned in a vertical plane and having a horizontal axis of rotation journaled in the forward end of the fuselage, a disc positioned above the fuselage, crossed substantially semi-circular arms positioned in longitudinal and transverse planes in relation to the fuselage and extended downwardly from the said disc, rollers journaled on the upper surface of the fuselage through which the arms extend, cables extended from the arms through the fuselage, a propeller journaled on the disc, positioned on a horizontal plane and having a vertical axis of rotation, and means rotating the propeller mounted on the disc from the interior of the fuselage.

3. In a toy airplane, the combination which comprises an elongated horizontally disposed fuselage, wheels mounted on arms extended downwardly from the fuselage, a propeller positioned to rotate in a vertical plane and having a horizontal axis of rotation journaled in the forward end of the fuselage, an upwardly bowed disc positioned in a horizontal plane and spaced above the fuselage, crossed substantially semi-circular arms extended downwardly from the disc and spaced above the fuselage, longitudinally and transversely positioned rollers journaled on the fuselage and positioned to receive the said arms, a propeller positioned to rotate in a horizontal plane and mounted to rotate about a vertical axis positioned above the disc, a shaft having universal joints therein extended from the propeller positioned above the disc to the interior of the fuselage, cables extended from the arms extended from the disc into the fuselage, and means in the fuselage for controlling the cables and rotating the shaft extended to the propeller positioned above the disc.

EARL V. SANDERS.

REFERENCES CITED

The following references are of record in the file of this patent:

UNITED STATES PATENTS

| Number | Name | Date |
|---|---|---|
| 1,414,241 | Wells | Apr. 25, 1922 |
| 1,903,440 | Cambridge | Apr. 11, 1933 |
| 2,054,610 | Volpicelli | Sept. 15, 1936 |
| 2,380,580 | Cierva | July 31, 1945 |

FOREIGN PATENTS

| Number | Country | Date |
|---|---|---|
| 362,683 | France | Apr. 11, 1906 |